May 22, 1951 — R. E. SPOKES — 2,554,128
BONDING ELEMENT FOR FRICTION ELEMENT ASSEMBLIES
Filed Sept. 5, 1947 — 2 Sheets-Sheet 1

Inventor:
Ray E. Spokes
By: Wallace and Cannon
Attorneys

May 22, 1951  R. E. SPOKES  2,554,128
BONDING ELEMENT FOR FRICTION ELEMENT ASSEMBLIES
Filed Sept. 5, 1947  2 Sheets-Sheet 2
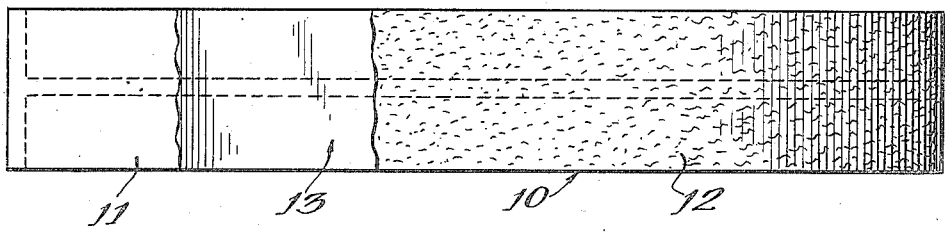
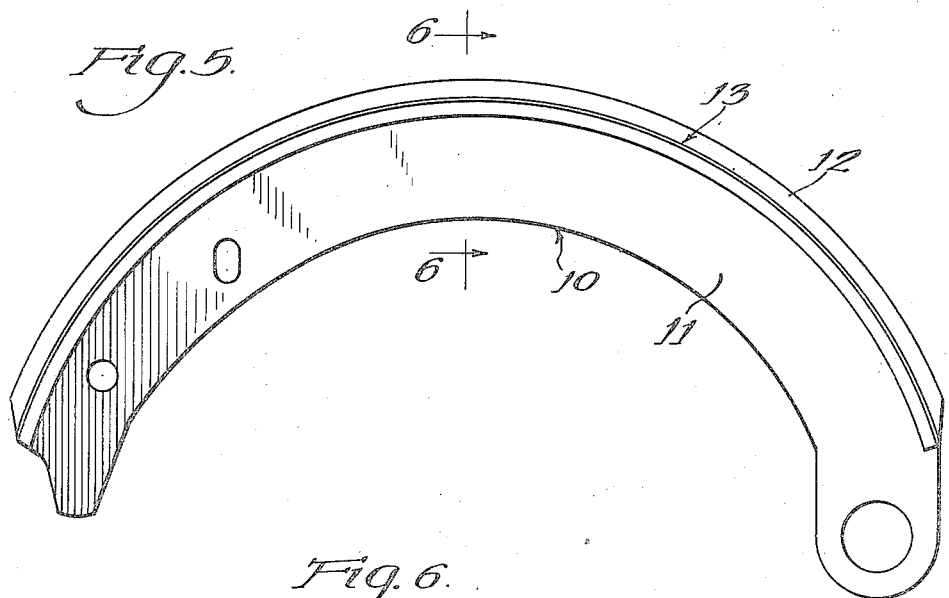
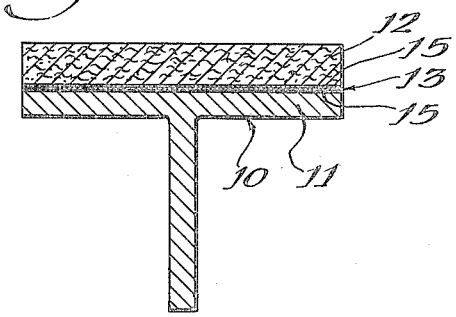
Inventor:
Ray E. Spokes
By: Wallace and Cannon
Attorneys Patented May 22, 1951

2,554,128

UNITED STATES PATENT OFFICE 2,554,128

BONDING ELEMENT FOR FRICTION ELEMENT ASSEMBLIES

Ray E. Spokes, Ann Arbor, Mich., assignor to American Brake Shoe Company, Wilmington, Del., a corporation of Delaware Application September 5, 1947, Serial No. 772,316

1 Claim. (Cl. 117—155)

This invention relates to a friction element assembly comprised of a supporting member such, for example, as an automotive vehicle brake shoe, and a friction element such as a section of brake lining mounted thereon, and to a method of making such a friction element assembly.

More particularly, this invention relates to an automotive vehicle brake lining and brake shoe or clutch and clutch facing assembly and to a method of making such an assembly.

It has been known heretofore that friction elements, such as automotive vehicle brake linings, may be bonded to their supporting members, such as the brake shoes of automotive vehicles, by means of suitable adhesives such, for example, as heat-hardenable or thermosetting resins, so as to avoid the use of fastening elements, such as rivets and the like, and the necessity for boring or drilling the brake shoes and brake lining for the reception of such fastening elements.

Thus, it has been proposed heretofore, as in United States Patent No. 2,272,532, dated February 10, 1942, to William C. Shriver, on "Brake Lining Construction," to employ a sheet of resin-impregnated and supposedly "cleavable" paper, or like resin-impregnated supposedly cleavable fibrous material, for bonding automotive vehicle brake lining to automotive vehicle brake shoes to the end that when it is desired to replace the friction elements or, in other words, to reline the brake shoes, the old or used brake lining could be separated from its supporting member or brake shoe by cleaving or splitting the resin-impregnated paper bond therebetween.

The practice thus suggested has certain objectionable characteristics, some of which are pointed out in United States Patent No. 2,406,653, granted August 27, 1946, to Clyde S. Batchelor, on "Bonded Friction Assembly." Among these objectionable characteristics are that the supposed cleavability in the resin-impregnated paper or like fibrous material is, in itself, undesirable in that (a) if present in fact it would impart structural weakness to the resulting assembly; and (b) any attempt to remove a section of used brake lining by splitting the supposedly cleavable resin-impregnated bonding paper or like material, as by means of a chisel or the like, is extremely difficult, if not impossible, and tends to cause damage to the brake shoes or like supporting members.

In the latter patent referred to above, the patentee endeavored to solve the problem previously experienced in the art by providing a bonded friction assembly in which the intermediate strip of paper or like fibrous bonding material has a thickness within the limits of from 0.001" to 0.005". According to such prior practice the thickness of the paper or other bonding sheet is confined within the lower limit stated, namely, 0.001", to prevent the resin or other bonding adhesive from penetrating too deeply into the paper sheet and so as to leave an unimpregnated middle section in the paper sheet which may be dissolved out or softened by immersing the complete friction assembly in a strong caustic solution such, for example, as a 50 per cent sodium hydroxide solution. The same patentee discloses that the reason for confining the thickness of the paper sheet within the upper limit of 0.005" specified is that if the paper sheet is substantially thicker than 0.005" penetration of the resin or other bonding adhesive is apt to be insufficient with the result that planes of cleavage may be present in the intermediate or middle zone of the paper or like fibrous material bonding sheet with consequent structural weakness in the resulting complete friction assembly.

It has been found in actual practice, however, that it is very difficult to control the impregnation or penetration of a thermosetting resin or other heat-hardenable bonding adhesive into a sheet of paper having a thickness in the order of 0.001" so that the tendency is for the entire body or thickness of the paper to become completely impregnated with the resin or other heat-hardenable bonding adhesive. This results in making it very difficult, if not impossible, to remove the used brake lining by dissolving out or softening the paper bonding sheet by immersing the complete friction assembly in a strong caustic solution. The reason for this is that since the entire body or thickness of the paper sheet is thus actually impregnated with the resin or other heat-hardenable adhesive, it can not be removed by dissolving it within a strong caustic solution since such a resin-impregnated paper bonding sheet is not substantially attacked by even a strong caustic solution.

Moreover, it has been found that when such a friction assembly is immersed in a caustic solution the only area in which the caustic solution is effective on even the unimpregnated portions of the paper sheet is along the marginal edges of the paper sheet where the latter is exposed to and may be attacked by the caustic solution.

Still another difficulty which presents itself in attempting to dissolve out or soften the paper bonding sheet in such prior friction element assemblies is the fact that the strong caustic solution tends to develop a high concentration of semi-dextrinized material where it comes in contact with the paper bonding sheet and this semi-dextrinized material retards or inhibits the desired dissolving action of the caustic solution upon the paper bonding sheet.

It has not been found practical, therefore, to remove used brake lining, or like used friction material, from a friction element assembly by immersing the complete friction element assembly in a strong caustic solution for the purpose of endeavoring to dissolve out or soften up the paper or like bonding sheet.

An additional problem which has been encountered in connection with prior attempts to employ resin-impregnated paper or like material for the purpose of bonding brake lining to a supporting member, such as a brake shoe, and which has not heretofore been successfully solved, is the problem of affording sufficient thermosetting resin or other heat-hardenable adhesive at those irregular surface areas between the brake lining and its supporting shoe which frequently exist in such friction element assemblies. This problem is complicated by the fact that if a relatively large and excessive quantity of the thermosetting resin or other heat-hardenable bonding adhesive is employed a substantial portion of the thermosetting bonding resin or like heat-hardenable bonding material will exude at the side or marginal edges of the friction element assembly when heat and pressure are applied thereto during the bonding operation, and thus form an objectionable exudate at these points.

Accordingly, an object of the present invention is to afford a new and improved friction element assembly, and a new and improved method of making the same, which in use overcome the foregoing and other problems encountered in the use of such friction element assemblies.

An additional object of the present invention is to afford a novel and efficient method for bonding a friction element, such, or example, as a strip or section of brake lining, to a supporting member such, for example, as a brake shoe, clutch facing or the like.

A further object of the invention is to provide, as a new article of manufacture, a novel bonding element comprised of a sheet or strip of paper or like fibrous material coated with a novel adhesive bonding coating of the present invention, for use in bonding a friction element such, for example, as a strip of brake lining, clutch facing, or the like, to a supporting member such, for example, as a brake shoe, or the like.

Another object of the invention is to provide a novel method of making the new bonding element for use in bonding a friction element such, for example, as a strip of brake lining, clutch facing, or the like, to a supporting member such as a brake shoe, or the like.

An additional object of the present invention is to provide a novel bonding composition for use in coating a sheet of paper or like bonding material to a supporting member such, for example, as a brake shoe or the like.

Other and further objects of the present invention will be apparent from the following description and claim and are illustrated in the accompanying drawings which, by way of illustration, show a typical embodiment of the invention and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claim.

Fig. 4 is a top plan view of a friction element assembly made in accordance with the practice of the present invention, a portion of the friction element or brake lining being broken away to reveal the underlying and intermediate resin-coated paper bonding sheet;

Fig. 5 is a side elevational view of the friction element assembly illustrated in Figs. 3 and 4; and Fig. 6 is a transverse sectional view on line 6—6 in Fig. 5.

Figure 1:
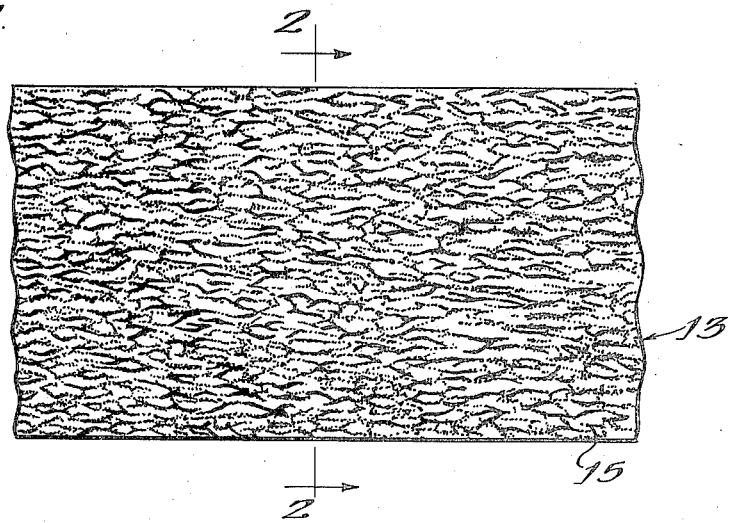
Fig. 1 is a fragmentary top plan view of a section or strip of the new resin-coated bonding paper which forms a part of and is utilized in the practice of the present invention.
Figure 2:
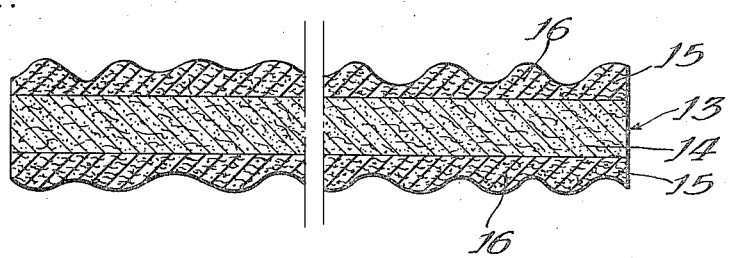
Fig. 2 is an enlarged broken transverse sectional view on line 2—2 in Fig. 1.

A friction element assembly made in accordance with the practice of the present invention is illustrated in Figs. 3 to 6 inclusive, of the drawings, wherein it is generally indicated at 10, and comprises a supporting member in the form of a brake shoe 11, a friction element in the form of a strip of brake lining 12, and an intermediate resin-coated bonding strip or member 13 (Figs. 1 and 2). I employ as a base a sheet 14 of suitable absorptive paper or other suitable absorptive cellulosic material, of suitable thickness, which is preferably about 0.007″. The base sheet 14 may be in the form of a web and I coat and impregnate the base sheet 14 in any suitable manner, as by passing a web of the base sheet 14 through an impregnating and coating bath having substantially the composition set forth in the following Example 1 in which all parts indicated are in terms of parts by weight:

*Example 1*

Parts by weight

Thermosetting phenolic-aldehyde type resin
(one-step phenol-formaldehyde resin) ___ 35.5
Asbestos (short fiber) _____ 13.0
Pigment (cryolite) $(NaF)_3.AlF_3$ (pulverized) _____ 7.0
Solvent (ethyl or denatured alcohol) _____ 19.0

Another suitable impregnating and coating composition which may be employed in the practice of the present invention, in place of the impregnating and coating composition referred to in the foregoing Example 1, is illustrated in the following Example 2, in which all parts indicated are by weight:

*Example 2*

Parts by weight

Thermosetting phenolic-aldehyde resin
(one-step phenol-formaldehyde resin) __ 15
Butadiene-acrylonitrile copolymer _____ 22
Asbestos _____ 13
Pigment (cryolite) $(NaF)_3.AlF_3$ (pulverized) _____ 7
Sulphur _____ 0.75
Solvent, monochlorbenzene (20 per cent);
methyl ethyl ketone (80 per cent) _____ 19

In place of the butadiene-acrylonitrile copolymer referred to in Example 2, above, a like percentage of a chloroprene or chlorinated butadiene type of so-called synthetic rubber or elastomer may be employed.

In the use of the impregnating and coating composition set forth in the foregoing Example 1, or that which is referred to in the foregoing Example 2, the asbestos and the finely divided mineral pigment (cryolite) are intimately mixed with the resin-solvent mixture before the paper base sheet is passed therethrough.

In the practice of the present invention 1.0 part of paper, representing 23.0 per cent of the total weight of the coated paper base sheet, was coated with 3.4 parts (77 per cent) by weight, of the coating and impregnating composition having the composition set forth in the foregoing Example 1, or that set forth in Example 2.

The paper base sheet 14 is thus coated on both surfaces thereof with a coating 15 of asbestos-filled pigmented thermosetting phenol-formaldehyde resin and, at the same time, a certain amount of the resin penetrates into and impregnates the absorptive paper base sheet 14.

The thus coated and impregnated paper base sheet 14 is then preferably passed through or between pressure or so-called squeeze rolls. During this operation a certain additional amount of the resin is forced into the body of the paper base sheet 14 and the asbestos-filled and pigmented coating composition disposed upon the surface of the paper base sheet 14 is caused to assume an irregular or uneven formation, which is indicated at 16 in the drawings and is generally shown in an enlarged scale in Fig. 2. This irregular or uneven formation 16 in the surface coatings 15 is caused by the tackiness of the asbestos-filled pigmented resin coating and impregnating composition and the resulting drag or friction of the rubber pressure or so-called squeeze rolls thereon during the operation of passing the thus coated and impregnated paper base sheet or web 14—15 therethrough. The thus treated paper base sheet may then be allowed to dry whereupon it is ready for use.

The thermosetting phenol-formaldehyde or equivalent phenolic-aldehyde resin employed in the coating and impregnating bath of the present invention is preferably one which has good aging characteristics over a wide range of varying condtions of atmospheric temperature and humidity so that the resulting coated and impregnated paper bonding sheet 14—15 will possess good aging characteristics and adequate so-called shelf life when marketed for use by automative vehicle brake service stations, garages, and like places at which the invention may be practiced.

As an alternative procedure and method for use in the practice of the present invention, and for preparing the coated and impregnated paper bonding sheet 14—15, a two-step phenol-formaldehyde or equivalent phenolic-aldehyde resin may be employed. In the practice of this form of the present invention the paper base sheet or web 14 may be passed through an impregnating bath of hexamethylenetetramine, or other resin-hardening agent, whereupon the thus treated paper base sheet or web may be passed through a bath containing the asbestos-filled and pigmented resin coating and impregnating composition (exclusive of the resin-hardening agent).

The friction element assembly 10 is completed by bonding the friction element 12, which may be a strip of brake lining, clutch facing or the like, to a supporting member such as a brake shoe 11, by subjecting the component parts of the assembly to heat and pressure in a suitable press.

In the alternative procedure set forth above the resin-hardening agent will react with the resin components of the bond during the bonding operation.

Figure 3:
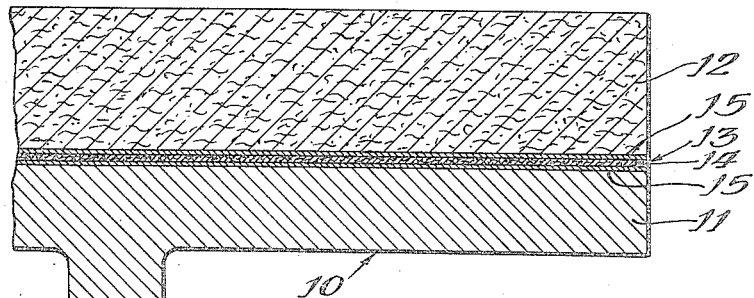
Fig. 3 is an enlarged fragmentary sectional view of a friction element assembly made in accordance with the practice of the present invention.

When the components of the friction assembly are thus subjected to heat and pressure in a press, the thermosetting resin component of the asbestos-filled and pigmented resin coating and impregnating composition is fused and the high areas in the uneven and irregular surface 16 thereof (Fig. 2) are levelled off to form the substantially flat or uniplanar asbestos-filled and resin-impregnated bonding layers 15 which are illustrated in Figs. 3 and 6 of the drawings.

When the bonding operation is thus carried out an adequate mass or quantity of the asbestos-filled and pigmented thermosetting resin coating composition is fused to assure a good bond between the friction element or brake lining 12 and its supporting member or brake shoe 11 throughout substantially the entire interfitting surface area between the friction element or brake lining 13 and its supporting member or brake shoe 11, including the uneven or irregular surface areas which frequently exist in one or both of these parts.

An additional advantage of the above-described method employed in the practice of the present invention is the fact that due to the asbestos and pigment fillings therein the tendency of the heat-fusible and heat-hardenable or thermosetting resinous adhesive to flow during the bonding operation is minimized with the result that an excess of the bonding resin is avoided. This eliminates any tendency of the adhesive resinous bonding compositions to exude at the sides or marginal edges of the friction element assembly during the bonding operation.

Moreover, the asbestos and pigment components of the resinous bonding composition employed in the present invention improve the bonding characteristics of the resinous bonding composition and of the paper base sheet 14 coated and impregnated therewith.

In addition, a friction element assembly made in accordance with the practice of the present invention has the further advantage and desirable characteristics which resides in the fact that the asbestos component of the asbestos-filled and pigmented resin coating and impregnating composition increases the resistance of the completed friction element assembly to impacts or shocks to which such friction element assemblies are subjected in use.

In the practice of the present invention the used friction element or strip of brake lining may be removed from its supporting member, such as a brake shoe, by chiseling the used friction element or brake lining from its supporting member or brake shoe, as far as possible, and then grinding off the remaining portions of the lining and asbestos-filled and pigmented bonding composition to provide a smooth clean surface for the reception of a new friction element or strip of brake lining.

It will thus be seen from the foregoing description, considered in conjunction with the accompanying drawings, that the present invention affords a novel friction element assembly, a novel method of making the new friction element assembly, and a novel asbestos-filled and pigmental resin coated and impregnated bonding sheet of paper or like absorptive material for use in making the new friction element assembly.

It will also be seen from the foregoing description, considered in conjunction with the accompanying drawings, that the present invention has the desirable advantages and characteristics, and accomplishes its intended objects, including those hereinbefore pointed out and others which are inherent in the invention.

I claim:

A thermosetting bonding element for use in bonding a friction element to a supporting member, the bonding element composed of a sheet of absorptive cellulosic material of the thickness of 0.007 inch, the sheet being impregnated with a thermosetting phenolic-aldehyde resin and having on both sides thereof an uneven coating of the thermosetting resin, the resin having dispersed therein short asbestos fibers and finely divided cryolite, the impregnating and coating material consisting by weight of about thirty-five (35) parts of thermosetting resin, thirteen (13) parts of asbestos fibers and seven (7) parts of cryolite, the bonding element being composed by weight of about twenty-eight per cent (28%) cellulosic material and seventy-two per cent (72%) impregnating and coating material.

RAY E. SPOKES.

REFERENCES CITED

The following references are of record in the file of this patent:

UNITED STATES PATENTS

| Number | Name | Date |
| --- | --- | --- |
| 1,540,983 | Fenton | June 9, 1925 |
| 2,029,525 | Ellis | Feb. 4, 1936 |
| 2,098,082 | Bowen et al. | Nov. 2, 1937 |
| 2,118,898 | Price | May 31, 1938 |
| 2,272,532 | Shriver | Feb. 10, 1942 |
| 2,292,118 | Guhl | Aug. 4, 1942 |
| 2,366,025 | Hall | Dec. 26, 1944 |
| 2,406,653 | Batchelor | Aug. 27, 1946 |
| 2,426,421 | Tilden | Aug. 26, 1947 |